April 14, 1959 J. THEVENAZ 2,882,046

MACHINE FOR THE MAGNETIC RECORDING AND REPRODUCTION OF SOUND ON A PERFORATED STRIP

Filed May 4, 1954 3 Sheets-Sheet 1

INVENTOR
Jean Thevenaz.

BY [signature]

ATTORNEY

INVENTOR
*Jean Thevenaz.*

BY [signature]

ATTORNEY

INVENTOR
*Jean Thevenaz.*

BY

ATTORNEY

United States Patent Office 2,882,046
Patented Apr. 14, 1959

2,882,046

MACHINE FOR THE MAGNETIC RECORDING AND REPRODUCTION OF SOUND ON A PERFORATED STRIP

Jean Thevenaz, Grandson, Switzerland, assignor to Paillard S.A., Sainte-Croix, Switzerland, a corporation of Switzerland Application May 4, 1954, Serial No. 427,423

Claims priority, application Switzerland February 2, 1954

8 Claims. (Cl. 271—2.3)

When using machines for magnetically recording and reproducing sound, such as cinematographic sound projectors, for instance, one of the chief objects to be obtained consists in the constancy of the speed at which the film unwinds in register with the location of the sound recording or sound reading point. To this end, there is generally provided a flywheel which is driven by the film through the agency of a roller rigid with its shaft, said flywheel having for its object to damp the variations in the speed of unwinding of the film, which variations arise through imperfections in the mechanism driving the sprocket wheels, through imperfections in said wheels and also as a consequence of the clearance between their teeth and the perforations of the film. The adherence between the film and the roller controlling the flywheel is obtained by any known means such as tensioning rollers. The latter have for their object to absorb also the variations in speed which the flywheel has not removed.

It would be of advantage to record and reproduce the sound in register with the actual roller controlled by the flywheel since the action of the flywheel is at a maximum on the section of the film engaged by the roller. However, this leads to very intricate problems in the execution of the machine. Certain producers have proposed housing the magnetic heads inside the roller. This solution, although it provides excellent results as concerns stability of the film speed, shows the drawback of requiring a roller having a diameter large enough to house therein the magnetic heads, and consequently this leads to a lower speed of the flywheel which in its turn leads to the requirement of a larger mass for the flywheel, if it is desired to retain the same kinetic energy. On the other hand, the magnetic heads should assume a reduced bulk so that they may be housed inside the roller and this leads to considerable difficulty in their execution. Furthermore, the voltage of the electric current at the output of such miniature heads is obviously lower and the amplifying means are consequently more expensive. These drawbacks are still more objectionable in the case of a projector provided for the magnetic recording and reproduction of sound in accordance with stereophonic binaural methods.

My invention has for its object to remove the above drawbacks and it covers more particularly a machine including at least one magnetic head for the magnetic recording and reproduction of sound on a magnetic track carried by a support constituted by a perforated strip. Said machine includes in the usual manner a driving mechanism which ensures the continuous progression of the perforated sound-carrying strip for both directions of operation of the machine, said mechanism including at least two strip-feeding sprocket wheels and a flywheel for uniformizing the movement of the strip, which flywheel is rigid with a roller over which the perforated strip passes, while the magnetic head and the roller cooperate with said strip at a point located between the two sprocket wheels.

The machine according to my invention distinguishes from all prior machines through the fact that the first sprocket wheel located ahead of the magnetic head with reference to the direction of forward movement in the machine i.e. to the direction corresponding to the recording or to the reproduction of sound, is connected with the driving mechanism of the machine through the agency of a clutch which provides for disengagement of the sprocket wheel with reference to the driving mechanism during forward movement and reengagement thereof during rearward movement, while a brake acts on said first sprocket wheel so as to provide a predetermined tensioning of the strip with a view to make it adhere to the roller and to the magnetic head, during the forward movement of the perforated strip inside the machine.

I have illustrated diagrammatically and by way of a mere exemplification, in accompanying drawings, two preferred embodiments of a machine according to my invention, which machine is intended more particularly for use as a cinematographic sound projector. In said drawings.

Figure 1:
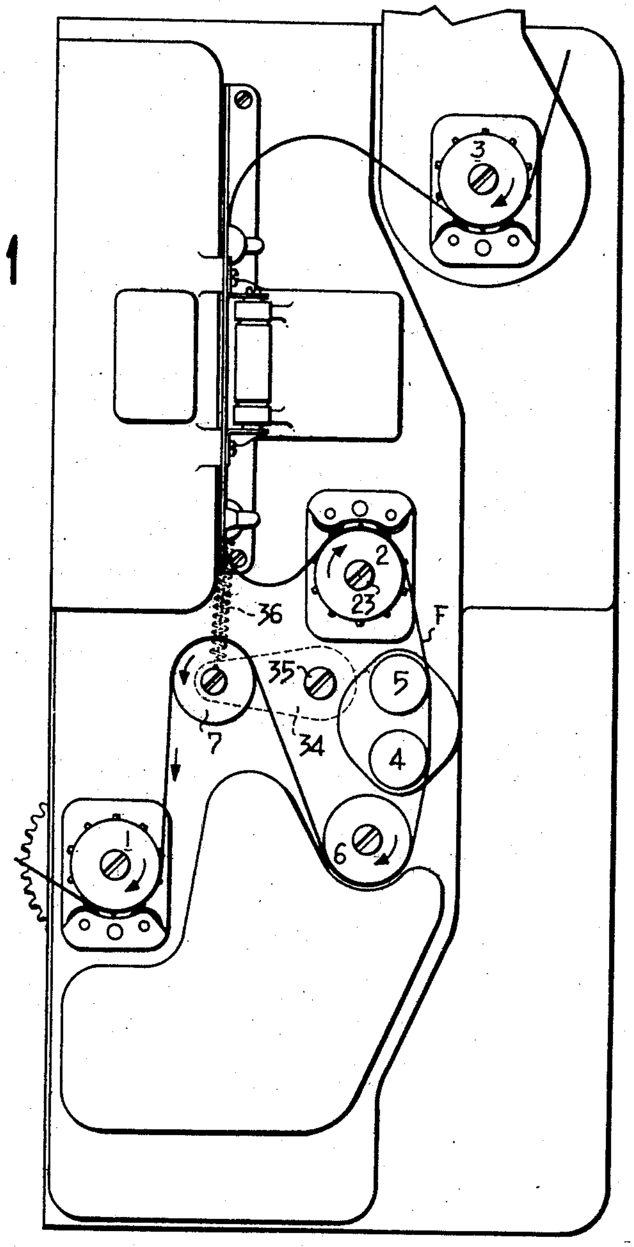
Fig. 1 is an elevational view of the projector including means for driving the film or perforated strip and means for magnetically recording and reproducing the sound.

As apparent from inspection of Fig. 1, the projector includes three sprocket wheels 1, 2, 3 driving the film F, the sprocket wheels 2 and 1 being more particularly provided for the continuous unwinding of the film in front of the magnetic heads 4 and 5 between said sprocket wheels. The head 4 is intended for the magnetic recording and reproduction of sound and the head 5 for wiping out the record. A flywheel is provided, which is driven by the film through the agency of a roller 6 rigid with its shaft, said flywheel having for its object a damping of the variations in the speed of unwinding of the film arising through imperfections in the mechanism driving the sprocket wheels 1, 2, 3, through imperfections in said sprocket wheels and also through the clearance between the teeth of the latter and the perforations in the film F. Between the roller 6 and the sprocket wheel 1 is located a tensioning roller 7 adapted to provide for adherence between the film and the roller 6 on one hand, and to absorb the variations in speed of the film section engaging the sprocket wheel 1 on the other hand. Said tensioning roller 7 is carried by an arm 34 pivotally secured to the carrier frame at 35 and submitted to the action of a spring 36. The direction of unwinding of the film F during projection, as illustrated by the arrows, is that leading from the sprocket wheel 3 to the sprocket wheel 1. When driving the film in such a direction, the driving mechanism of the projector executes what I may term a forward movement while the drive of the film in the opposite direction is obtained by a reverse or rearward movement.

Figure 2:
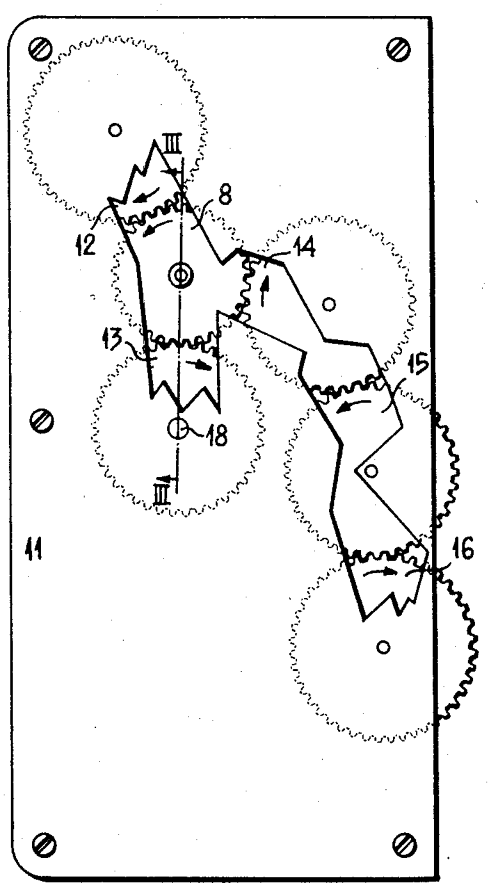
Fig. 2 is on a reduced scale an elevational view of the projector on the side opposed to that illustrated in Fig. 1, the carrier plate being torn off so as to show the driving mechanism for the sprocket wheels.
Figure 3:
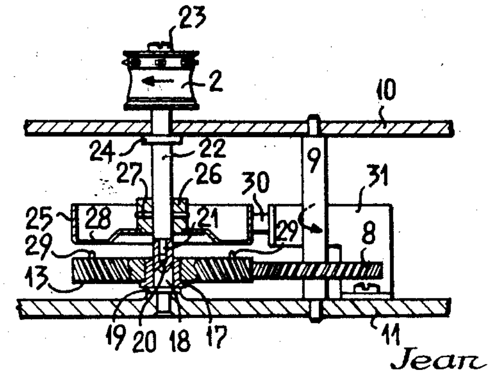
Fig. 3 is a cross-section through line III—III of Fig. 2.

The sprocket wheels 1, 2 and 3 are driven by the driving mechanism of the projector through a helical wheel 8 (see Figs. 2 and 3). Said helical wheel, which is rigid with a spindle 9 (Fig. 3) revolubly carried between the plates 10 and 11 of the projector, meshes with the wheels 12, 13, and 14. The wheel 12 is rigid with the spindle carrying the sprocket wheel 3 and serves for the drive of the latter. The wheel 14 drives, through the agency of a wheel 15, a further wheel 16 rigid with the spindle carrying the sprocket wheel 1 and which serves to drive the latter. The gearing which has just been described is shown in Fig. 2.

Fig. 3 shows in detail the means for driving the sprocket wheel 2. The helical wheel 13 driven by the helical wheel 8 is rigid with a sleeve 17 revolubly and slidingly carried by a spindle 18. The latter is rigid with the carrier plate 11 and is provided with a peripheral bearing flange 19 which serves as an abutment for the sleeve 17 when it is shifted axially towards said plate 11. The spindle 18 is also provided with an axial bore 20 which serves as a bearing for the tip 21 of a spindle 22. The latter extends through the other carrier plate 10 and carries at its end, beyond the latter, the sprocket wheel 2 which is secured to it by means of a screw 23. A collar 24 on the spindle 22 prevents the latter from being shifted axially between the plate 10 and the cooperating stationary spindle 18. In proximity with the latter, the spindle 22 carries a drum 25 with which it revolves in unison as provided by the sleeve 26 and the pin 27 connecting said parts together.

The drum 25 is provided on its surface facing the wheel 13 with a plurality of openings 28 distributed annularly on a circle the diameter of which is equal to that of a cylindrical surface concentric with the spindle 22 and on which are located projections 29 rigid with the wheel 13 and extending in parallelism with the spindle 18, towards the drum 25, the distribution of the projections being identical with that of the opening 28.

A stationary shoe 30 of a material having a high coefficient of friction against metal, such as felt for instance, is provided for producing a braking torque at the periphery of the drum 25. Said shoe 30 is carried by a support 31 rigid with the plate 11.

The system including the wheel 13 and the drum 25 forms a clutch adapted to connect the mechanism driving the film with the sprocket wheel 2 and it operates in the following manner:

During the forward movement of the projector, the direction of rotation of the wheel 8, which drives the wheel 13, is such that the axial component produced by the reaction between the helical teeth on the interengaging wheels 8 and 13 urges the wheel 13 towards the collar 19 on the spindle 18. The pitch of the teeth on the wheels 8 and 13 is selected in a manner such that said axial component is sufficient to produce a shifting of the wheel 13 whereby the sleeve 17 engages the collar 19 as illustrated in Fig. 3. The wheel 13 is thus located in its position furthest removed from the drum 25 so that no mechanical connection is provided between the wheel and the drum and consequently between the projector-driving means and the sprocket wheel 2. The latter is driven only by the film engaging it, and the film is driven in its turn by the sprocket wheels 3 and 1 so that the sprocket wheel 2 acts as a mere idling roller. The braking torque produced by the frictional action of the shoe 30 on the drum 25, is intended to produce a tractional streses on the film so as to improve its adherence to the driving roller 6 controlling the flywheel.

On the contrary, when the projector executes a rearward movement, the direction of rotation of the wheel 8 changes and consequently the same is the case for the direction of the axial component produced by the reaction between the helical teeth on the wheels 8 and 13. This component acts now so as to urge the wheel 13 towards the drum 25. Each of the projections 29 engages one of the openings 28 in the drum 25 so as to make the latter revolve in unison with the wheel 13. The drum being rigid with the spindle 22 carrying the sprocket wheel 2, the result is that the latter is positively driven by the projector-driving means. Thus, during rearward movement of the projector, the sprocket wheel 2 forms an actual film-driving wheel.

The preceding disclosure shows that the clutch provided for the drive for the sprocket wheel 2 allows the latter to act selectively as a friction roller and as an actual film-driving wheel. The possibility of cutting out the sprocket wheel 2 as a film-driving wheel during forward movement, i.e. during the recording or the reproduction of sound, forms a considerable advantage inasmuch as it allows cutting out the variations in the speed of unwinding the film, which are generally ascribable to said sprocket wheel. On the other hand, this structural improvement allows retaining the possibility of rearward movement, as required in the case of projectors designed for magnetically recording and reproducing sound, with a view to proceeding to the wiping out and correction of the record on any part of the film.

The absence of any disturbing variations in the speed of unwinding of the film, which variations are due to the sprocket wheel just preceding the roller controlling the flywheel, allows locating the magnetic head outside said roller. As apparent from inspection of Fig. 1, the magnetic heads 4 and 5 in the projector described are located between the sprocket wheel 2 and the roller 6. This leads to the advantage of making the execution of the heads easier since their bulk is no longer limited as is the case of the known projectors referred to hereinabove. Furthermore, the diameter of the roller 6 may be a very small one and this allows obtaining a higher speed for the flywheel, the mass of which may thus be reduced while producing the same kinetic energy as a heavier wheel revolving at a lower speed.

The braking torque adapted to exert a tractional stress on the film as it passes over the sprocket wheel 2, cooperates efficiently in the damping of the variations in speed, the range of frequencies of which approximates the natural frequency of the flywheel.

Figure 4:
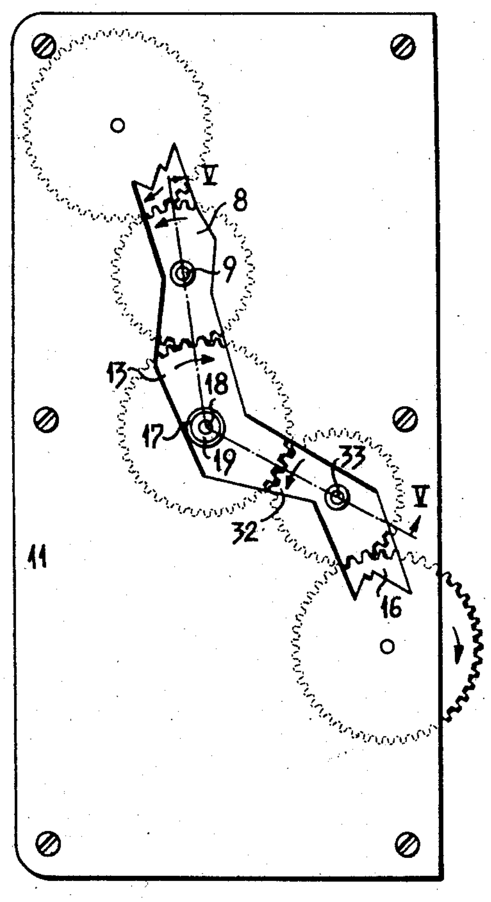
Fig. 4 is a view similar to Fig. 2 of a modified embodiment.
Figure 5:
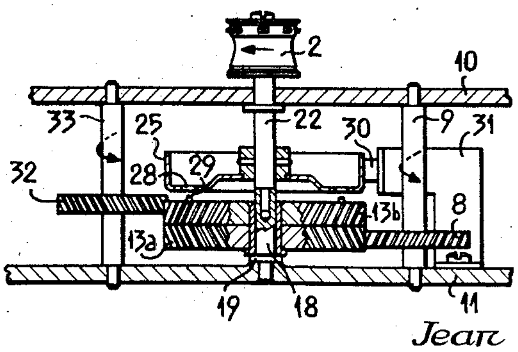
Fig. 5 is a cross-section through line V—V of Fig. 4.

Figs. 4 and 5 illustrate a modification of the above decribed projector. In said embodiment, the sprocket wheel 1 is no longer driven through the agency of the wheels 14, 15 and 16 but through the agency of the wheels 13, 32, 16; on the other hand, the wheel 13 is constituted in this case by a double helical wheel including two sections 13*a* and 13*b* the teeth of which have opposite pitches. The teeth 13*a* mesh with the wheel 8 as precedingly while the teeth 13*b* mesh with the wheel 32 rigid with the spindle 33, said wheel 32 being thus adapted to be driven by the teeth 13*b* on the wheel 13.

This second embodiment includes a clutch system similar to that disclosed with reference to Figs. 1, 2 and 3; in other words, it also includes a drum 25 rigid with the spindle 22 carrying the sprocket wheel 2 and projections 29 rigid with the wheel 13 and adapted to engage openings 28 in the drum 25 for the engaged position of the clutch. Similarly, a shoe 30 is provided, which is carried as precedingly by a carrier 31.

The operation of the driving means in this second embodiment is identical with that disclosed with reference to the first embodiment. It is easy to ascertain that the introduction of the double helical wheel 13 produces an axial component due to the reaction between the helical teeth on the wheel 8 and the teeth of the section 13*a* on the wheel 13, which component acts in the same direction as and adds its action to that of the axial component of the reaction produced by the engagement between the helical teeth on the wheel 32 and the cooperating teeth of the section 13*b* on the wheel 13.

Consequently, when the film driving means move in the forward direction corresponding to the arrows in Figs. 4 and 5, the wheel 13 is urged against the collar 19 by reason of the meshing of the wheels 8 and 32 respectively with the teeth on the sections 13*a* and 13*b* on the wheel 13. The wheel 13 is thus urged away from the drum 25 and the sprocket wheel 2 is driven into rotation by the film itself in antagonism with the braking torque produced by the friction shoe 30 engaging the drum 25.

On the contrary, when the film-controlling mechanism is reversed in its operation, the reaction between the helical teeth on the wheels 8, 13 and 32 produces an axial force urging the wheel 13 against the drum 25 so that the sprocket wheel 2 is positively driven through the agency of the wheels 8 and 13.

Obviously, many modifications may be brought to the clutch system disclosed; thus, it is possible to substitute for the drum 25 a simple perforated disc. It is also possible to cut out the projections 29 and the perforations 28 and to provide a frictional drive between the wheel 13 and the drum 25, said friction drive exerting a torque sufficient for the drive of the sprocket wheel 2, without any slip. The double helical wheel 13 provided with teeth in the second embodiment disclosed may be replaced by two wheels revolving in unison, the pitch of the teeth on said two wheels being of opposite directions.

It is also possible to substitute for the automatic clutch described an electromagnetic or mechanical clutch controlled independently by hand or possibly submitted to an automatic control associated with the operation reversing the direction of operation of the machine.

Obviously the incorporation of a sprocket wheel driven through the agency of a clutch, as disclosed hereinabove, is not limited to cinematographic projectors and it may be used advantageously in any other machine serving for the recording or reproduction of sound on a perforated magnetic strip.

I claim:

1. In a machine for the magnetic recording and reproduction of sound on a perforated strip, the combination comprising, a casing plate, a first strip sprocket wheel mounted on said plate, a second strip sprocket wheel mounted on said plate, said strip sprocket wheels being spaced from each other, means for selectively driving said sprocket wheels forwardly and rearwardly, said driving means being operatively connected to said sprocket wheels, a clutch positioned between said second sprocket wheel and said driving means, means for disengaging said clutch with respect to said driving means and said second sprocket wheel during forward movement of the strip and for reengaging said clutch with respect to said driving means and said second sprocket wheel during rearward movement of the strip, said disengaging and reengaging means being operatively connected to said driving means and to said second sprocket wheel, a roller means for engaging said strip, said roller means being mounted on said plate between said first and second sprocket wheels, a flywheel coaxially rigid with said roller, and at least one magnetic head mounted on said plate between said roller and said second sprocket wheel and operatively engaging the strip, whereby said second sprocket wheel is a mere idling roller during forward movement of the strip and is an actual strip-driving wheel during rearward movement of the strip.

2. In a machine for the magnetic recording and reproduction of sound on a perforated strip, the combination comprising, a casing plate, a first strip sprocket wheel mounted on said plate, a second strip sprocket wheel mounted on said plate, said strip sprocket wheels being spaced from each other, means for selectively driving said sprocket wheels forwardly and rearwardly, said driving means being operatively connected to said sprocket wheels, a clutch positioned between said second sprocket wheel and said driving means, means for disengaging said clutch with respect to said driving means and said second sprocket wheel during forward movement of the strip and for reengaging said clutch with respect to said driving means and said second sprocket wheel during rearward movement of the strip, said disengaging and reengaging means being operatively connected to said driving means and to said second sprocket wheel, a roller means for engaging said strip, said roller means being mounted on said plate between said first and second sprocket wheels, a flywheel coaxially rigid with said roller means, at least one magnetic head mounted on said plate between said roller means and said second sprocket wheel and operatively engaging the strip, and a braking means for damping the variations in speed of said second sprocket wheel, whereby said second sprocket wheel is a mere idling roller during forward movement of the strip and is an actual strip-driving wheel during rearward movement of the strip and whereby the braking torque produced by the braking means produces a tractional stress on the strip thereby improving its adherence to said roller means.

3. The machine of claim 2 including a tensioning means for engaging the strip, said means being mounted on said plate between said roller means and said first sprocket wheel, whereby the strip adheres to said roller means and the variations in speed of the strip section engaging said first sprocket wheel are absorbed.

4. In a machine for the magnetic recording and reproduction of sound on a perforated strip, the combination comprising, a casing plate, first, second, and third strip sprocket wheels mounted on said plate and spaced from each other, means for selectively driving said sprocket wheels forwardly and rearwardly, said means being operatively connected to said sprocket wheels, said first sprocket wheel having a spindle through its center and positioned in said plate, said driving means including a wheel rigid with said spindle, a clutch positioned between said second sprocket wheel and said driving means, means for disengaging said clutch with respect to said driving means and said second sprocket wheel during forward movement of the strip and for reengaging said clutch with respect to said driving means and said second sprocket wheel during rearward movement of the strip, said means being operatively connected to said driving means and to said second sprocket wheel, a roller means for engaging said strip, said roller means being mounted on said plate between said first and second sprocket wheels, a flywheel coaxially rigid with said roller means, at least one magnetic head mounted on said plate between said roller and said second sprocket wheel and operatively engaging said strip, a tensioning means for engaging said strip, said latter means being mounted on said plate between said roller means and said first sprocket wheel, a strip guide means for guiding the strip from the said third sprocket wheel to said second sprocket wheel, said strip guide means being positioned between said third sprocket wheel and said second sprocket wheel, and a braking means for damping the variations in speed of said second sprocket wheel, whereby said second sprocket wheel is a mere idling roller during forward movement of the strip and is an actual strip-driving wheel during rearward movement of the strip, whereby the braking torque produced by the braking means produces a tractional stress on the strip, thereby improving its adherence to said roller, and whereby the variations in speed of the strip section engaging said first sprocket wheel are absorbed.

5. The machine of claim 1 including a spindle means for mounting on said plate said second sprocket wheel being fixedly secured on said spindle means, said spindle means being mounted in said plate and passing therethrough, said clutch means including a coaxial element mounted on said spindle and rigid therewith and an axially slidable helical wheel mounted on said spindle below said coaxial element, said slidable helical wheel having attached thereto means for engaging the coaxial element when said helical wheel is moved upwardly against said coaxial element, said means for disengaging said coaxial element and said helical wheel during forward movement of the strip and for reengaging said coaxial element and said helical wheel during rearward movement of the strip including a spindle mounted in said plate parallel to said spindle means for mounting said second sprocket wheel and a helical wheel rigid with said spindle and operatively engaging said axially slidable helical wheel of said clutch means and said driving means, the pitch of the helical teeth of said slidable wheel being opposite to the pitch of the helical teeth of said disengaging and reengaging means, whereby the axially slidable wheel of said clutch will engage the said coaxial element upon rearward movement of the strip and will disengage from the said coaxial element upon forward movement of the strip.

6. The machine of claim 2 including a spindle means for mounting on said plate said second sprocket wheel being fixedly secured on said spindle means, said spindle means being mounted in said plate and passing therethrough, said clutch means including two coaxial elements mounted on said spindle, one of said elements being a drum coaxially rigid on said spindle with respect to said second sprocket wheel and the other of said elements being an axially slidable helical wheel mounted on said spindle below said drum, said slidable helical wheel having attached thereto means for engaging said drum when said wheel is moved upwardly against said drum, said means for disengaging said drum and said wheel during forward movement of the strip and for reengaging said drum and said wheel during rearward movement of the strip including a spindle mounted in said plate parallel to said spindle means for mounting said second sprocket wheel and a helical wheel rigid with said spindle and operatively engaging said axially slidable helical wheel of said clutch means and said driving means, the pitch of the helical teeth of said slidable wheel being opposite to the pitch of the helical teeth of said disengaging and reengaging means, said braking means including a stationary friction shoe, said shoe permanently engaging said drum.

7. In a machine for the magnetic recording and reproduction of sound on a perforated strip, the combination comprising, a casing plate, first, second, and third strip sprocket wheels mounted on said plate and spaced from each other, means for selectively driving said sprocket wheels forwardly and rearwardly, said means being operatively connected to said sprocket wheels, said first sprocket wheel having a spindle through its center and positioned in said plate, said driving means including a wheel fixedly secured on said spindle, a spindle means for mounting said second sprocket wheel rigidly therewith, said spindle means being mounted in said plate and passing therethrough, a clutch positioned between said second sprocket wheel and said driving means, said clutch including two coaxial elements mounted on said spindle means, one of said elements being a drum coaxially rigid on said spindle means with respect to said second sprocket wheel and the other of said elements being an axially slidable helical wheel mounted on said spindle means below said drum, said slidable helical wheel having attached thereto means for engaging said drum when said wheel is moved upwardly against said drum, means for disengaging said drum and said wheel during forward movement of the strip and for reengaging said drum and said wheel during rearward movement of the strip including a spindle mounted in said plate parallel to said spindle means for mounting said sprocket wheel and a helical wheel fixedly secured on said spindle and operatively engaging said axially slidable wheel of said clutch and said driving means including that portion for driving said third sprocket wheel, the pitch of the helical teeth of said slidable wheel being opposite to the pitch of the helical teeth of said wheel of said disengaging and reengaging means, a roller means for engaging said strip, said roller means being mounted on said plate between said first and second sprocket wheels, a flywheel coaxially rigid with respect to said roller means, at least one magnetic head mounted on said plate between said roller and said second sprocket wheel and operatively engaging said strip, and a brake including a friction shoe mounted in cooperating relationship with said drum of said clutch.

8. In a machine for the magnetic recording and reproduction of sound on a perforated strip, the combination comprising, a casing plate, first, second, and third strip sprocket wheels mounted on said plate and spaced from each other, means for selectively driving said sprocket wheels forwardly and rearwardly, said means being operatively connected to said sprocket wheels, a clutch positioned between said second sprocket wheel and said driving means, said clutch including a gear having two superposed lower and upper coaxial series of helical teeth of opposite pitches, said gear being axially slidable with respect to said second sprocket wheel, and a drum coaxially mounted with respect to said second sprocket wheel and positioned between said gear and said sprocket wheel, said drum being rigid with respect to said second sprocket wheel, a spindle mounted in said plate and passing therethrough, said latter spindle being positioned between said second sprocket wheel and said third sprocket wheel, a helical wheel mounted on said latter spindle and engaging said lower helical teeth of said superposed coaxial series on said gear, the pitch of the teeth of said helical wheel being opposite to the pitch of said lower helical teeth, another spindle mounted in said plate and passing therethrough, said other spindle being positioned between said first sprocket wheel and said second sprocket wheel, another helical wheel mounted on said other spindle and engaging said upper helical teeth of said superposed coaxial series on said gear, the pitch of the teeth of said other helical wheel being opposite to the pitch of said upper helical teeth, each of said helical wheels being operatively connected to said means for driving said sprocket wheels, a roller means for engaging the strip, said roller means being positioned between said first sprocket wheel and said second sprocket wheel, a flywheel coaxially rigid with said roller, at least one magnetic head operatively engaging the strip, said magnetic head being positioned between said roller means and said second sprocket wheel, and a strip guide positioned between said second sprocket wheel and said third sprocket wheel.

References Cited in the file of this patent

UNITED STATES PATENTS

| | | |
|---|---|---|
| 2,618,710 | Camras | Nov. 18, 1952 |
| 2,678,357 | Schnessler | May 11, 1954 |
| 2,694,107 | Camras | Nov. 9, 1954 |